United States Patent [19]
Sutton

[11] Patent Number: 6,150,610
[45] Date of Patent: *Nov. 21, 2000

[54] TAMPER-RESISTANT SURFACE MOUNTED RACEWAY COVER

[75] Inventor: Neil Sutton, Guelph, Canada

[73] Assignee: The Wiremold Company, West Hartford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/084,751

[22] Filed: May 26, 1998

[51] Int. Cl.⁷ .................................................. H02G 3/04

[52] U.S. Cl. ........................... 174/68.3; 174/97; 174/101

[58] Field of Search ................................. 174/101, 68.1, 174/68.3, 95, 96, 97, 98, 100

[56] References Cited

U.S. PATENT DOCUMENTS

| | | | |
|---|---|---|---|
| 2,090,239 | 8/1937 | Strang | 138/116 |
| 3,329,763 | 7/1967 | D'Esopo | 174/70 R |
| 4,077,434 | 3/1978 | Sieckert et al. | 138/92 |
| 4,918,886 | 4/1990 | Benoit et al. | 52/221 |
| 5,203,711 | 4/1993 | Bogiel | 439/215 |

*Primary Examiner*—Kristine Kincaid
*Assistant Examiner*—Adolfo Nino
*Attorney, Agent, or Firm*—McCormick, Paulding & Huber LLP

[57] ABSTRACT

Surface mount raceway makes use of a prior art bracket, of the type that normally supports an electrical device plate in the raceway base, to interact with notches provided in flanges of the raceway cover, as well as with marginal edges of the raceway base. The cover cannot be easily removed once the bracket has been so assembled with the cover and the base.

14 Claims, 5 Drawing Sheets

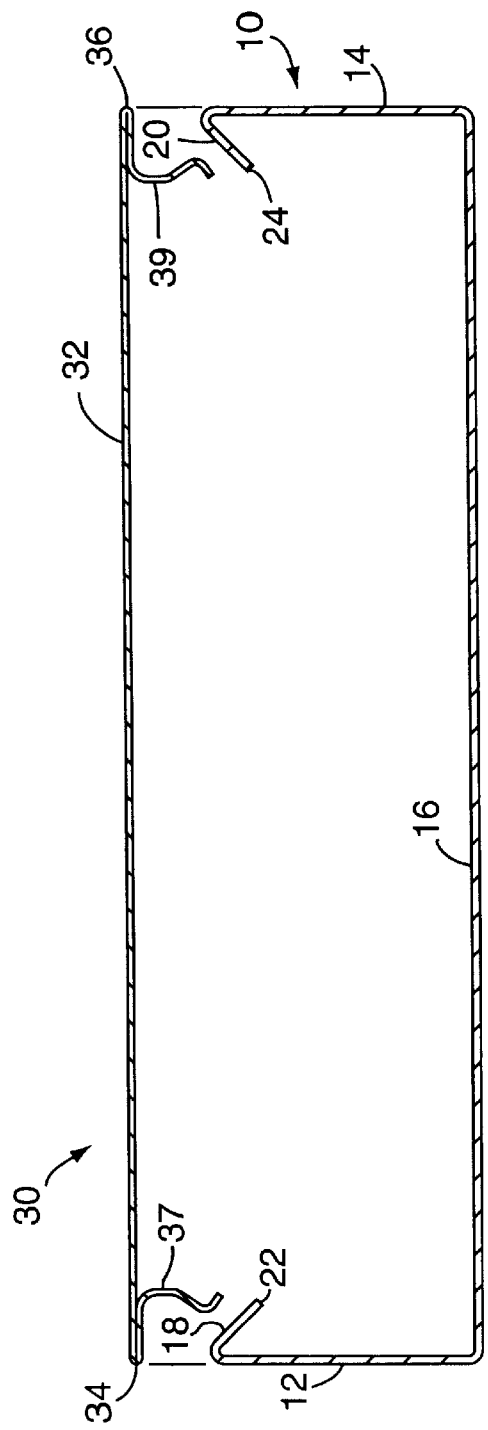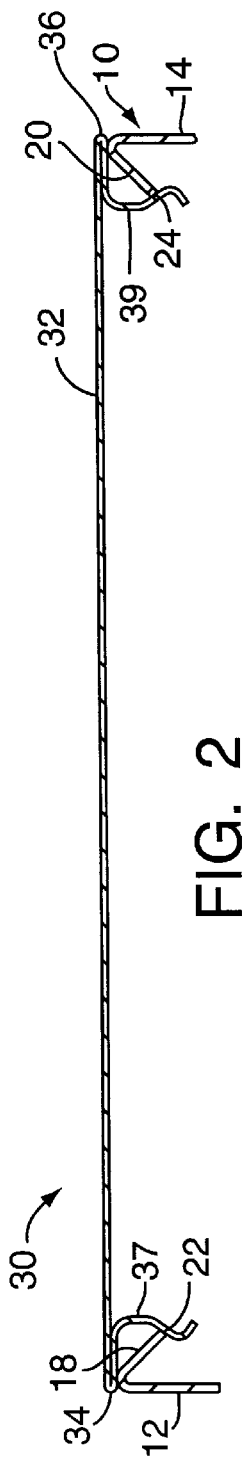
FIG. 1
PRIOR ART
FIG. 2
PRIOR ART

TAMPER-RESISTANT SURFACE MOUNTED RACEWAY COVER

FIELD OF THE INVENTION

This invention relates generally to surface mounted raceways, and deals more particularly with raceways characterized by a raceway base, which defines at least one forwardly open channel for wiring or the like, and a raceway cover that is adapted to be releasably secured to the base as a result of the flexibility of the sidewalls of the channel.

BACKGROUND OF THE INVENTION

Metal raceways are available from The Wiremold Company of West Hartford, Conn. under various designations including, but not limited to, Wiremold's 3000, 4000 and 6000. A typical Wiremold raceway system of this type generally comprises an elongated raceway base of channel-shape, and with opposed sidewalls that extend away from the base and define longitudinally extending marginal edges. These edges are spaced from one another to define an elongated opening therebetween. These marginal edges further define inwardly projecting lips that are adapted to receive longitudinally extending depending flanges of the raceway cover. The sidewalls of the channel or base can be spread slightly to allow entry of the raceway cover flanges for assembling of the cover with the base.

SUMMARY OF THE INVENTION

In accordance with the present invention, means is provided for preventing removal of a raceway cover once assembled with its base, and said means preferably comprises at least one bracket for each raceway cover provided adjacent one end of the cover and including end portions of the bracket that fit into the lips of the raceway base, and also fit into relieved regions of the raceway cover flanges, so that once a bracket has been assembled with the base and the cover, the cover cannot be easily removed or otherwise tampered with by unauthorized persons.

BRIEF DESCRIPTION OF THE DRAWINGS

These and other features, aspects, and advantages of the present invention will become better understood with regard to the following description, appended claims, and accompanying drawings wherein:

FIG. 1 shows in cross-section and in slightly exploded relationship, a typical raceway cover and base;

FIG. 2 shows the same raceway cover and base of FIG. 1, but in assembled relationship to one another;

DETAILED DESCRIPTION

Figure 3:
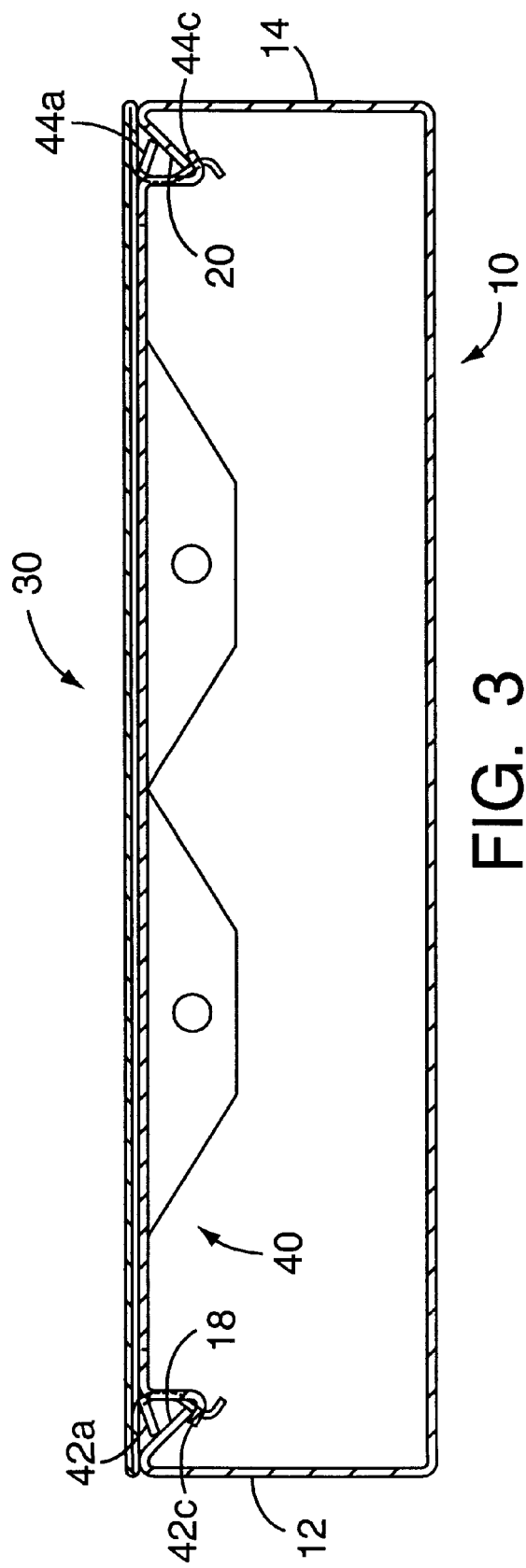
FIG. 3 is a view similar to FIG. 2, but with a bracket so provided adjacent to one end portion of a raceway cover (shown in phantom lines) that the bracket serves to interlock the cover and base, preventing any disassembly of the cover from the base without first removing the bracket.

Turning now to a detailed description of the first embodiment of the invention illustrated in the drawings, and referring first to the prior art raceway configuration of FIGS. 1 and 2, a surface raceway base 10 is preferably formed of metal, as for example, steel or aluminum, but could be of polymeric plastic material also. The raceway has a generally channel shape, as best shown in FIG. 1, such that opposed sidewalls 12 and 14 are provided integrally with a bottom wall 16. The bottom wall is adapted to be secured to a structure, such as a wall, for example, in order to provide separate raceway channels capable of accommodating power lines, communication lines, fiber optic cabling, or the like. Although not shown, conventional dividers can be provided within the channel shape for separating the various types of wiring contained therein. The raceway base 10 is adapted to receive a cover 30 that spans these base sidewalls, but it is within the scope of this invention to provide a divider in the base that will accommodate a plurality of covers so that access to each of several separated channels can be had without disturbing an adjacent channel.

The raceway base 10 defines a single channel of appropriate size between a practical minimum cross-section up to a practical maximum. In the larger sizes, more than one channel would generally be provided by supporting conventional dividers (not shown) supported within the channel in accordance with prior art teachings. Inwardly turned marginal edge portions 18 and 20 of the sidewalls 10 and 12 define lips 22 and 24 that provide a convenient anchoring point for support clips (not shown) that, in-turn, support the dividers.

Turning next to the cover 30, it too is preferably of bent metal or plastic configuration having a flat central portion 32 that is adapted to cover the opening defined by the base 10, and the cover 30 further includes marginal edges 34 and 36 that are adapted to overlay or overlie, respectively, the marginal edges 18 and 20 of the base sidewalls 10 and 12. The integrally formed cover 30 further includes depending flanges 37 and 39, which flanges are adapted to be releasably received between the inwardly turned marginal edges 18 and 20 of the base 10. Such a construction affords the installer with ease of assembly in that no tools are required for assembling the cover 30 with the base 10. However, as a result of designing these components to have such ease of assembly, it will be apparent that these components can also be readily disassembled. Such a situation can be undesirable in an environment where tampering with the wiring in some installations is a definite disadvantage.

Consequently, and in accordance with the present invention, means is provided for preventing the ready disassembly of these components without interfering with the ease with which such components must be assembled in the field. As best shown in FIG. 3, such means for securing said cover to said base preferably takes the form of a bracket 40 that may be similar to or even identical to that commonly utilized in such raceways for supporting electrical devices, such as outlet plugs, or telephone jacks, or the like.

Figure 5:
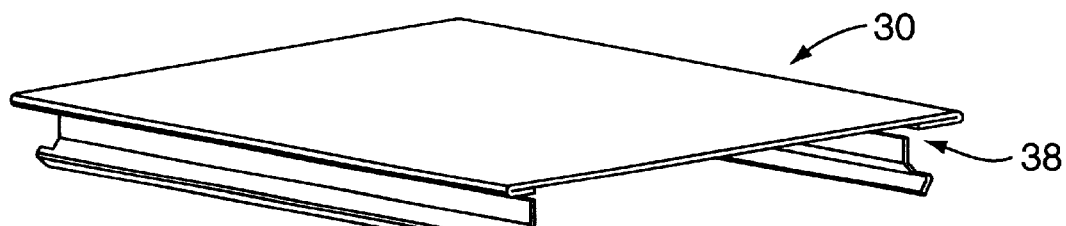
FIG. 5 is a perspective view of the raceway cover with notched or relieved end portions of the depending flanges of the cover so formed as to receive the end portions of the bracket.
Figure 6:
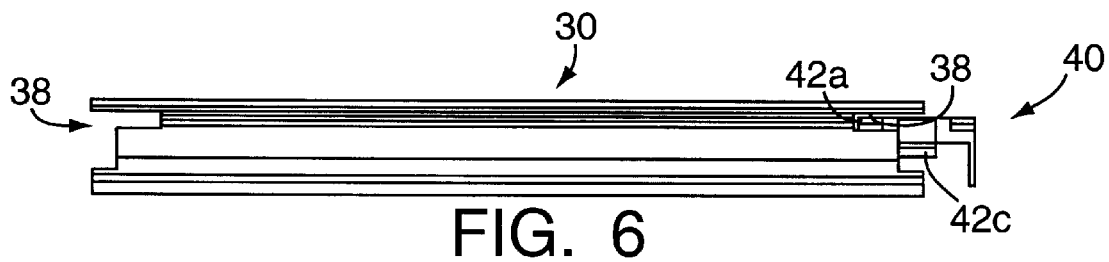
FIG. 6 is an side view of the cover in assembled relationship with the bracket, but with the base (not shown) to better reveal the interaction between the end portion of the bracket and the relieved region of the raceway cover flange.

Still with reference to FIG. 3, the bracket 40 spans the opening defined by the base 10, and is adapted to be provided between the dependent flanges of the raceway cover 30. In accordance with the present invention, the raceway cover flanges are cut away or relieved to accommodate the bracket 40. Unlike the conventional use of such brackets 40 where the cover flanges are cut away for locating an outlet plug or the like, the present invention requires that these flanges be precisely notched as shown in FIGS. 5 and 6.

Figure 7:
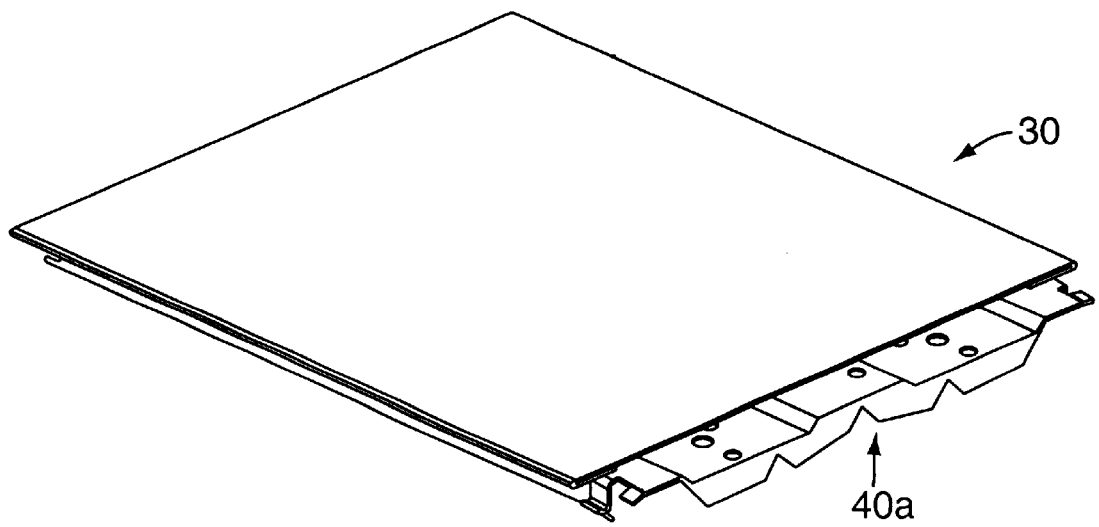
FIG. 7 is a perspective view of the assembled raceway cover and a bracket of alternative configuration, but with the same offset end portions for engaging the relieved regions of the raceway cover flanges.

In accordance with the present invention, the bracket 40 is provided in underlying relationship to one end portion of the raceway cover, as suggested in FIG. 7 for the bracket 40. The bracket 40a is of different configuration than that illustrated at 40 in FIGS. 3 and 4, but the end portions of the bracket 40 and the end portions of bracket 40 are of identical geometry in that they permit ready-assembly of the bracket with the base by spreading the base sidewalls slightly with a tool, such as a screwdriver, in accordance with techniques currently known to the installer in connection with installing outlet devices, for example.

Figure 4:
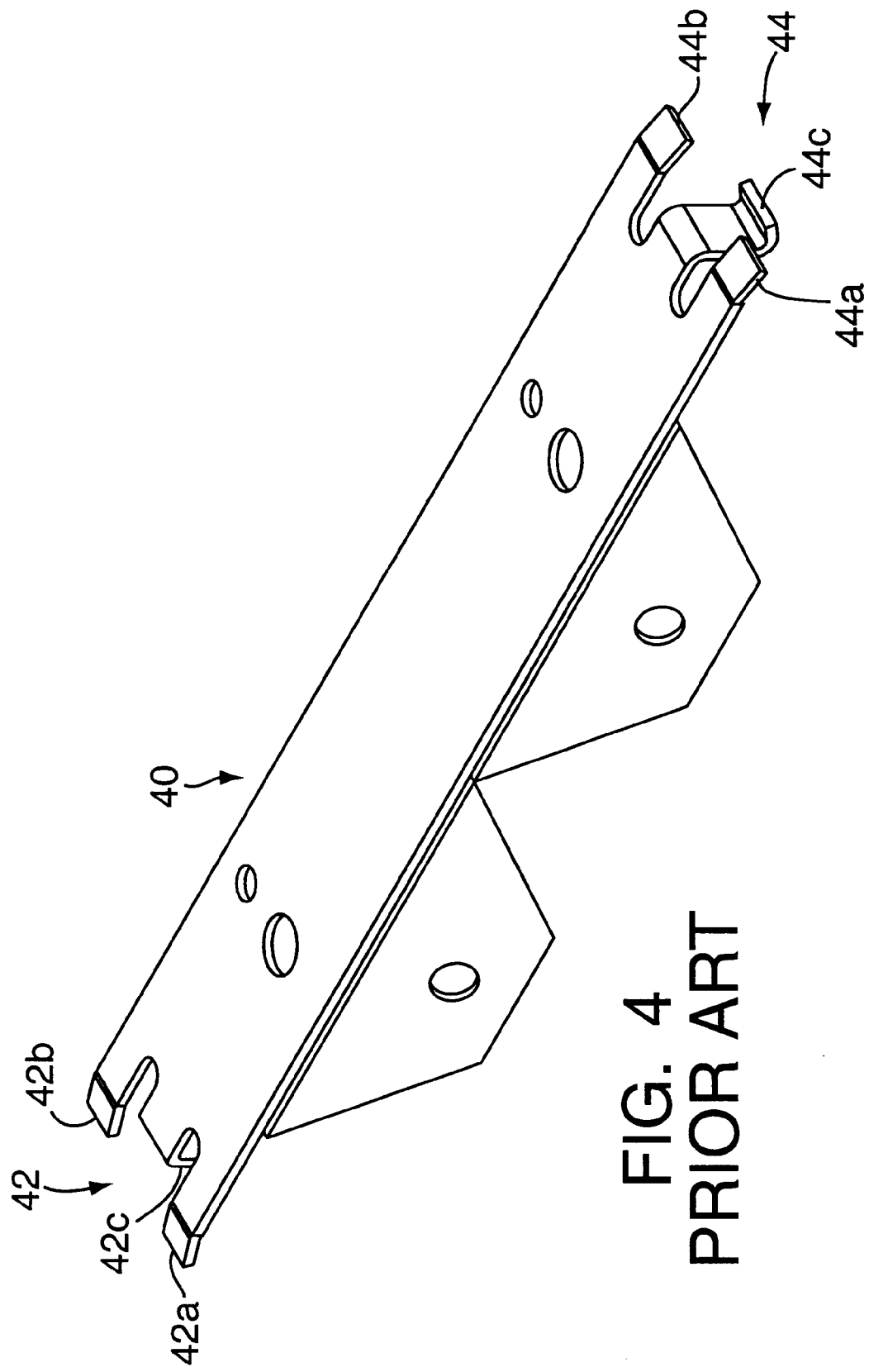
FIG. 4 is a perspective view of the bracket illustrated in FIG. 3.

With particular reference to FIG. 4, the bracket 40 has opposed ends 42 and 44 that are adapted to engage the in-turned marginal edges and the lips of the raceway base. More particularly, bifurcations $42_a$ and $42_b$ of the end 42 of the bracket 40 serve the dual function of engaging the marginal edges 18 and 20 in the base, and also serve to engage relieved regions, or notches provided for this purpose in the raceway cover flanges. These relieved regions or notches of the raceway cover flanges are best shown in FIGS. 5 and 6 at 38. Note the stepped notch configuration and the inner narrow notch for receiving the bifurcation 42a. The downturned L-shaped shelf 42c of the bracket 40 need only have a clearance notch in the cover flange because it is intended to engage the lip of the base. The narrow inner notch, however, is engaged by the bracket bifurcation 42a in order to prevent pulling the cover 30 from the base 10 as mentioned previously.

The L-shaped shelf portions or offset portions $42_c$ and $44_c$ that anchor each end portion of the bracket 40 in the base 10 prevent its removal except as a result of spreading the sidewalls 12 and 14 of the base 10. Such spreading of the sidewalls is effectively precluded in the present design as a result of the configuration for the aforedescribed notches 38 in the flanges of the cover 30. Although FIG. 6 does not show the base, the relationship between the bifurcation $42_a$ and the configuration of notch 38 is such that removal of the cover is effectively prevented, unless it can be slid longitudinally relative to the base away from the bracket 40. Only as a result of separating the cover 30 from the bracket 40, can one achieve the necessary spreading of the sidewalls of the base so as to permit removal of the cover or the bracket from the base.

It should be noted that the installer of a raceway system that has been provided in accordance with the present disclosure must, of necessity, have sufficient freedom of movement for the cover relative the base so as to permit assembly of the components in the manner described.

Figure 8:
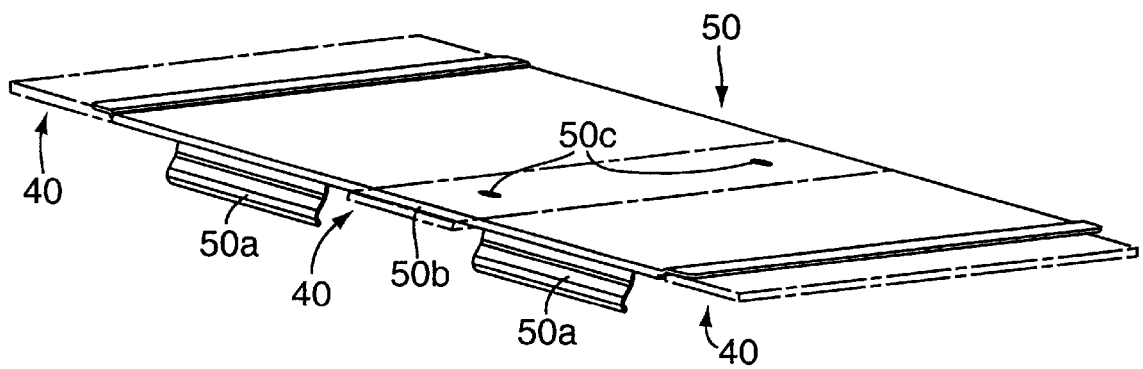
FIG. 8 is a perspective view of a raceway access cover plate such as used to end a run as described hereafter

FIG. 8 shows an access plate that can be used to secure two raceway covers in place at any point where the installer will need to provide a final assembly without having such freedom of movement of a cover relative a base.

The installer, either at the end of a run, or on a raceway between two walls will come to a point where it will not be possible to provide the last raceway cover in position as a result of utilizing a bracket of the type described above. At such a point, it is necessary to utilize a tamper resistant access plate 50, to complete and maintain the tamper resistant nature of the raceway system. This tamper resistant plate need not slide in the raceway, and has flanges 50a completely notched away at both ends, to allow the plate 50 to be placed directly down over the brackets that jut out from the adjoining covers. The flanges of the plate are also notched away in the middle 50b, and the plate comes with two countersunk holes to allow special "tamper resistant" fasteners to be screwed through the cover into a bracket of the type described above.

In summary, a conventional raceway cover is provided with specially shaped notches in the ends of the cover flanges. A conventional device bracket or equivalent is snapped into the raceway channel adjacent to the end of the cover, following which the bracket is slid so that its end portions move into the notches under the cover. The bracket protrudes from under the cover a distance approximately equal to half its width, as suggested in FIG. 7. Thus, the bracket is held to the base in much the same way as a conventional device bracket is held in-place, but due to the nature of and configuration for the notches in the cover flanges, the bracket holds the cover onto the raceway channel. The next cover can be snapped onto the raceway channel and slid into place alongside the cover shown in FIG. 7. As a result, a conventional appearance is provided for the raceway system, but access to or tampering with the raceway cover is effectively prevented except for the necessary access afforded at locations where it will be necessary to remove covers, as for example, the end of a run adjacent to the corner of a room. A small 6-inch plate can be utilized in this region, and special purpose screws provided so as to discourage tampering with the raceway system even at such locations.

While a preferred embodiment of the invention has been shown and described, various modifications and substitutions may be made without departing from the spirit and scope of the invention. Accordingly, it is to be understood that the present invention has been described by way of example, and not by limitation.

Having thus described my invention, what is claimed is:

1. A raceway for wiring and comprising:
   (a) an elongated raceway base defining at least one channel having opposed sidewalls, said sidewalls having longitudinally extending marginal edges that are spaced from one another to define an elongated opening therebetween, said base sidewall marginal edges defining lips projecting inwardly into said base opening;
   (b) an elongated raceway cover having a width that spans said opening, said cover having longitudinally extending marginal edges adapted to overlie said base sidewall marginal edges, said cover marginal edges defining depending flanges that interact with said in-turned lips of said base sidewall marginal edges to releasably secure said cover to said base; and
   (c) at least one bracket provided behind said cover and between said depending cover flanges for securing said cover to said base so that said at least one bracket is hidden by said cover.

2. The raceway, according to claim 1, wherein said at least one bracket has opposed ends for engaging said depending cover flanges.

3. The raceway, according to claim 1, wherein said at least one bracket has opposed ends for engaging said lips of said raceway base.

4. The raceway, according to claim 1, wherein said at least one bracket has opposed ends defining offset portions that engage said lips of said raceway base, and said depending cover flanges having relieved regions for accommodating said offset portions of opposed ends.

5. The raceway, according to claim 1, wherein said depending flanges of said raceway cover extend into said channel beyond said lips of said base sidewall marginal edges whereby said raceway cover can be releasably secured to said base by spreading said sidewalls.

6. The raceway, according to claim 5, wherein said at least one bracket has opposed ends for engaging said depending cover flanges.

7. The raceway, according to claim 5, wherein said at least one bracket has opposed ends for engaging said lips of said raceway base.

8. The raceway, according to claim 5, wherein said at least one bracket has opposed ends defining offset portions that engage said lips of said raceway base, and said depending cover flanges having relieved regions for accommodating said offset portions of said bracket opposed ends.

9. The raceway, according to claim 8, wherein said relieved regions of said depending cover flanges are provided adjacent at least one end of said raceway cover.

10. The raceway, according to claim 1, wherein said at least one bracket has opposed ends, each said opposed bracket end including bifurcations for engaging relieved region of each said depending cover flange, and each end of said at least one said bracket further including a depending L-shaped shelf between said bifurcations for engaging said lip of said raceway base.

11. The raceway, according to claim 10, wherein said relieved regions of said depending cover flanges are provided adjacent at least one end of said raceway cover.

12. The raceway, according to claim 10, wherein said depending flanges of said raceway cover extend into said channel beyond said lips of said base sidewall marginal edges whereby said raceway cover can be releasably secured to said base by spreading said sidewalls.

13. The raceway, according to claim 12, wherein said at least one bracket is adapted to be secured between said lips of said base by spreading said sidewalls whereby said bracket and said cover can be slidably moved into assembled relation to one another along said base.

14. The raceway according to claim 1, further including an additional raceway base and cover and an access plate having end portions fitting on top of said at least one bracket associated with adjacent, but spaced apart said elongated raceway cover and said additional raceway cover at a predetermined location along a wall structure where said raceway bases and covers are installed, and said at least one bracket behind said plate to which said plate is secured.

* * * * *

UNITED STATES PATENT AND TRADEMARK OFFICE
CERTIFICATE OF CORRECTION

PATENT NO. : 6,150,610
DATED : November 21, 2000
INVENTOR(S) : Neil Sutton

It is certified that error appears in the above-indentified patent and that said Letters Patent is hereby corrected as shown below:

Column 3, line 11, please change "40" to -- 40a --.

Column 3, line 14, please change "40" (first occurrence) to -- 40a --.

In the Claims:

Claim 10, column 6, line 2, please change "lip" to -- lips --.

Signed and Sealed this

First Day of May, 2001

*Attest:*

NICHOLAS P. GODICI

*Attesting Officer*     *Acting Director of the United States Patent and Trademark Office*